Nov. 17, 1931.    G. G. HARRINGTON    1,831,956
BLOW-OUT PREVENTER
Filed Oct. 27, 1930    2 Sheets-Sheet 1

George G. Harrington,
INVENTOR.

BY *J. Vincent Martin*
ATTORNEY

Nov. 17, 1931.    G. G. HARRINGTON    1,831,956
BLOW-OUT PREVENTER
Filed Oct. 27, 1930    2 Sheets-Sheet 2

George G. Harrington,
INVENTOR.

BY
ATTORNEY

Patented Nov. 17, 1931

1,831,956

UNITED STATES PATENT OFFICE

GEORGE G. HARRINGTON, OF HOUSTON, TEXAS, ASSIGNOR TO REED ROLLER BIT COMPANY, OF HOUSTON, TEXAS, A CORPORATION OF TEXAS

BLOW OUT PREVENTER

Application filed October 27, 1930. Serial No. 491,337.

This invention relates to blowout preventers.

In deep well drilling, high fluid pressures are frequently encountered which cause a rush and escape of fluid upwardly through the conventional casing about the drill stem; and at times such pressures are sufficiently great to blow the drill stem out of the casing, the disastrous consequences of which are well known to those skilled in the art.

This invention has for its general object the provision of a new and improved blow out preventer adapted to prevent the foregoing, which may be quickly and easily installed and removed, and which may be used while the drill stem is rotated and lowered in the casing to penetrate the formation therebelow.

Other specific objects will hereinafter appear.

Figure 1:
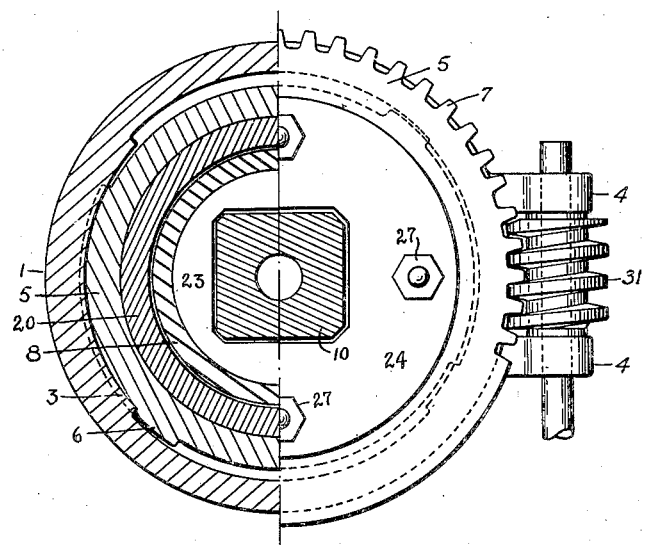
Figure 2:
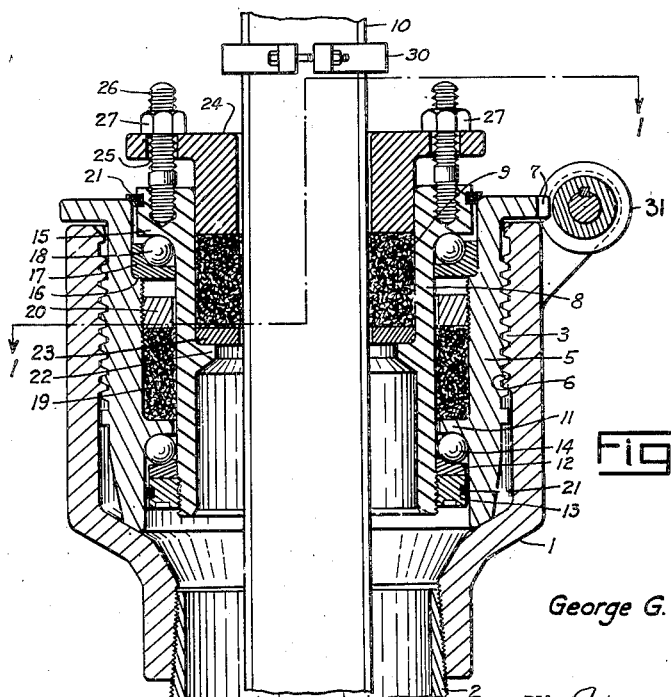
Figure 3:
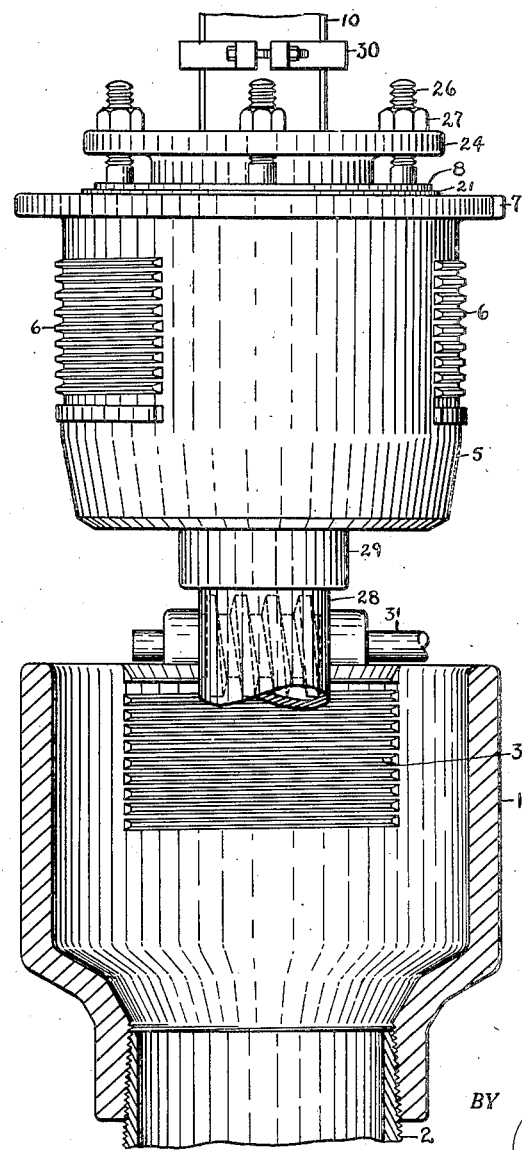

The preferred embodiment of the invention is illustrated by the accompanying drawings, of which Fig. 1 is a top plan view of the assembled elements, partly in section, taken on the line 1—1 of Fig. 2; Fig. 2, a sectional elevation of the assembled elements; and Fig. 3, an elevation of the packing means on the stem about to be lowered into the bowl, the latter of which is shown in section.

The bowl 1, mounted on the casing 2, has internal interrupted threads 3. Mounted upon the side of the bowl as indicated at 4 is the worm 31.

The packing means comprises a locking sleeve 5 having external interrupted threads 6 to engage the interrupted threads 3 of the bowl 1, and peripheral teeth 7 to be engaged by the worm 31. Rotatably secured within the locking ring 5 is the packing ring 8, and within the packing ring 8 is the packing 9. The kelly of the drill stem, that is, that section adapted to be engaged by the rotary (not shown) to effect rotation of the drill stem, is indicated at 10.

The locking sleeve 5 has an internal annular flange 11 and on the packing sleeve 8 is a raceway ring 12 held in place by the threaded retaining ring 13. Between the flange 11 and raceway ring 12, are the balls 14 whereby the upward thrust on the packing sleeve 8 and also the lateral thrust of said sleeve are sustained.

The locking sleeve 8 has an external annular flange 15. The packing sleeve 5 has an internal annular shoulder 16 to support a raceway ring 17. Between the flange 15 and raceway ring 17 are the balls 18 whereby the downward and lateral thrusts of the packing sleeve 5 are sustained.

To seal the space between the sleeves 5 and 8, a packing 19 may be placed upon the flange 11 and compressed by a threaded ring 20. To prevent the escape of grease placed about the ball bearings, suitable gaskets 21 may be placed, as shown.

The packing sleeve 8 has an internal annular flange 22, and upon this flange rests a floating ring 23 beneath the packing 9. Extending into the packing sleeve 8 above the packing 9 is the gland 24 having openings 25 therein in which the bolts 26 loosely fit. The gland 24 is free to move downwardly to compress the packing and is positively held against movement away from the packing by the nuts 27.

The blow out preventer may be used as follows:

The packing means having been placed upon the kelly 10, and the drill pipe 28 (Fig. 3) having been connected to the kelly 10, the packing means is permitted to slide downwardly on the kelly 10 until the floating ring 23 rests upon the collar 29, the downward movement of the packing means on the drill stem being thereby arrested. The drill stem is then lowered in the casing 2 until the locking sleeve 5 rests upon the internal shoulder formed by the reduction of the lower end of the bowl 6. The worm 31 is then rotated to effect engagement of the external interrupted threads 6 of the locking sleeve 5 and the internal interrupted threads 3 of of the bowl 1. Only a quarter turn of the locking sleeve 5 in the bowl 1 is necessary to effect this engagement, and the packing means is thereby securely locked in the bowl 1 as shown by Figs. 1 and 2. The drill stem may then be rotated.

The packing sleeve 8 rotates with the kelly 10 and within the locking sleeve 5. The kelly 10 is slidable in the packing sleeve 8. And so the blow out preventer is in place and functioning to prevent blow outs while the drill stem is rotated and lowered in the casing to penetrate the formation therebelow. If fluid under pressure is encountered, it will rise upwardly between the drill stem and the casing and force the ring 23 upwardly to compress the packing 9 which will prevent its escape. If the pressure is sufficiently great to elevate the drill stem in the casing, the collar 29 will strike the ring 23 and compress the packing, and the drill stem cannot escape from the casing because it will be held in the packing sleeve 8 by the gland 24.

The packing 9 may also be compressed at any time by tightening the nuts 27 of the bolts 26, and if desired a suitable clamp 30 may be secured to the kelly 10 to engage the gland 24 when the stem is lowered to force said gland downwardly and compress the packing 9, whereupon the nuts 27 may be tightened.

The packing means herein disclosed is designed to fit a substantially square kelly. Only a slight modification thereof, easily made by a skilled mechanic, is necessary to make it fit kellys of other shapes, and circular pipes.

Many advantages of this invention other than that hereinabove described will be apparent to those skilled in the art. The invention is not limited to the preferred embodiment shown. Various changes may be made within the scope of the following claims.

I claim:

1. The combination with a casing and a stem, of a bowl mounted on said casing and having internal interrupted threads; packing means on said stem and slidable into and out of said bowl, said means comprising a locking sleeve having external interrupted threads to engage the threads of said bowl, a packing sleeve on said stem and rotatably secured within said locking sleeve, and a packing within said packing sleeve.

2. The combination with a casing and a stem, of a bowl mounted on said casing and having internal interrupted threads; packing means slidable on said stem and slidable into and out of said bowl, said means comprising a locking sleeve having external interrupted threads to engage the threads of said bowl, a packing sleeve on said stem and rotatably secured within said locking sleeve, a packing within said packing sleeve, a floating ring below and movable to compress said packing, and a gland above and movable to compress said packing.

3. In deep well apparatus, the combination with a casing and a stem, of a bowl mounted on said casing and having internal interrupted threads and a worm; packing means slidable on said stem and slidable into and out of said bowl, said means comprising a locking sleeve having external interrupted threads to engage the threads of said bowl and teeth to be engaged by said worm, a packing sleeve on said stem and rotatably secured within said locking sleeve, ball bearings between said sleeves, a packing within said packing sleeve, a floating ring below and movable upwardly to compress said packing, a gland above and movable downwardly to compress said packing, and adjustable means to positively limit the movement of said gland away from said packing and to cause said gland to compress said packing.

4. The combination with a casing and a stem, of packing means comprising a locking sleeve releasably locked in said casing, a packing sleeve rotatably secured within said locking sleeve, two sets of ball bearings between said sleeves, one of said sets serving to sustain the upward thrust on said packing sleeve, and the other of said sets serving to sustain the downward thrust on said packing sleeve, and a packing ring between said sleeves and between said sets of bearings.

In testimony whereof, I hereunto affix my signature.

GEORGE G. HARRINGTON.